(12) United States Patent
Robin

(10) Patent No.: US 10,293,197 B2
(45) Date of Patent: May 21, 2019

(54) AZEOTROPE-LIKE COMPOSITIONS OF HFO-E-1,3,4,4,4-PENTAFLUORO-3-TRIFLUOROMETHYL-1-BUTENE AND E-1-CHLORO-3,3,3-TRIFLUOROPROPENE AND USES THEREOF

(71) Applicant: THE CHEMOURS COMPANY FC, LLC, Wilmington, DE (US)

(72) Inventor: Mark L Robin, Middletown, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 199 days.

(21) Appl. No.: 15/023,966

(22) PCT Filed: Oct. 7, 2014

(86) PCT No.: PCT/US2014/059386
§ 371 (c)(1),
(2) Date: Mar. 22, 2016

(87) PCT Pub. No.: WO2015/054174
PCT Pub. Date: Apr. 16, 2015

(65) Prior Publication Data
US 2016/0243389 A1    Aug. 25, 2016

Related U.S. Application Data

(60) Provisional application No. 61/888,155, filed on Oct. 8, 2013.

(51) Int. Cl.
*A62D 1/00* (2006.01)
*H01B 3/24* (2006.01)
(Continued)

(52) U.S. Cl.
CPC ......... *A62D 1/0028* (2013.01); *A62D 1/0057* (2013.01); *C08J 9/144* (2013.01);
(Continued)

(58) Field of Classification Search
CPC .... A62D 1/0028; A62D 1/0057; C09K 5/044; C09K 3/00; C09K 3/30; C09K 5/045;
(Continued)

(56) References Cited

U.S. PATENT DOCUMENTS

| 7,438,825 | B1 | 10/2008 | Chen et al. |
| 7,972,524 | B2 | 7/2011 | Robin |

(Continued)

FOREIGN PATENT DOCUMENTS

| CN | 101541715 | 9/2009 |
| CN | 101668566 | 3/2010 |

OTHER PUBLICATIONS

PCT International Search Report and Written Opinion dated Dec. 8, 2014.
(Continued)

*Primary Examiner* — Peter F Godenschwager
*Assistant Examiner* — Andrew J. Oyer

(57) ABSTRACT

Azeotrope-like compositions are disclosed. The azeotrope-like compositions are mixtures of HFO-E-1,3,4,4,4-Pentafluoro-3-trifluoromethyl-1-butene and E-1-Chloro-3,3,3-trifluoropropene. Also disclosed is a process of preparing a thermoplastic or thermoset foam by using such azeotrope-like compositions as blowing agents. Also disclosed is a process of producing refrigeration by using such azeotrope-like compositions. Also disclosed is a process of using such azeotrope-like compositions as solvents. Also disclosed is a process of producing an aerosol product by using such azeotrope-like compositions. Also disclosed is a process of using such azeotrope-like compositions as heat transfer media. Also disclosed is a process of extinguishing or suppressing a fire by using such azeotrope-like compositions. Also disclosed is a process of using such azeotrope-like compositions as dielectrics.

13 Claims, 1 Drawing Sheet

(51) Int. Cl.
  *C09K 3/00* (2006.01)
  *C08J 9/14* (2006.01)
  *C09K 3/30* (2006.01)
  *C09K 5/04* (2006.01)

(52) U.S. Cl.
  CPC ............... *C08J 9/146* (2013.01); *C08J 9/149* (2013.01); *C09K 3/00* (2013.01); *C09K 3/30* (2013.01); *C09K 5/044* (2013.01); *C09K 5/045* (2013.01); *H01B 3/24* (2013.01); *C08J 2203/162* (2013.01); *C08J 2203/182* (2013.01); *C08J 2300/22* (2013.01); *C08J 2300/24* (2013.01); *C09K 2205/122* (2013.01); *C09K 2205/126* (2013.01); *C09K 2205/32* (2013.01)

(58) Field of Classification Search
  CPC .......... C09K 2205/122; C09K 2205/32; C09K 2205/126; C08J 9/144; C08J 9/149; C08J 9/146; C08J 2300/22; C08J 2203/162; C08J 2300/24; C08J 2203/182; H01B 3/24
  See application file for complete search history.

(56) References Cited

U.S. PATENT DOCUMENTS 8,273,928 B2     9/2012  Knapp et al.
2016/0137895 A1* 5/2016  Kontomaris ............. F25B 7/00
                                              62/114

OTHER PUBLICATIONS

Doherty, M.F. et al., Conceptual Design of Distillation Systems, 2001, pp. 185-186 and 351-359, McGraw-Hill Higher Education.
Null, Harold R., Processing Vapor-Liquid Equilibrium Data, 1970, pp. 124-126, Wiley-Interscience Publisher.
Reid et al., Properties of Gases and Liquids, Fluid Phase Equilibria in Multicomponent Systems, pp. 241-387, 4$^{th}$ edition, McGraw Hill.
Walas, Stanley M., Activity Coefficients, Phase Equilibria in Chemical Engineering, 1985, pp. 165-244, Butterworth Publishers.
Office Action in Chinese Application No. 201480055261.1, dated Jul. 19, 2018, 9 pages (with English translation).

* cited by examiner

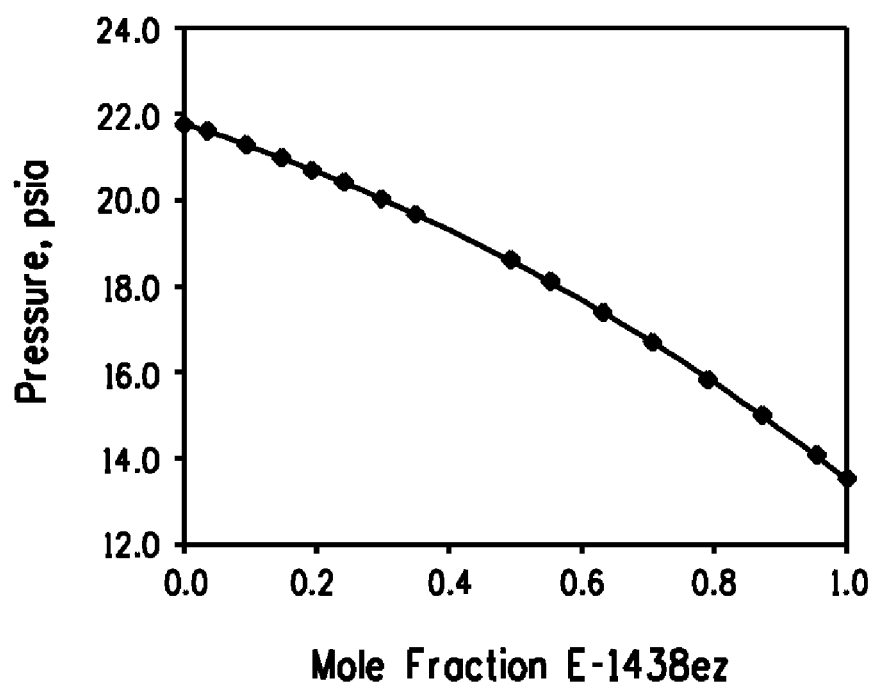

US 10,293,197 B2

AZEOTROPE-LIKE COMPOSITIONS OF HFO-E-1,3,4,4,4-PENTAFLUORO-3-TRIFLUOROMETHYL-1-BUTENE AND E-1-CHLORO-3,3,3-TRIFLUOROPROPENE AND USES THEREOF

This application represents a national filing under 35 U.S.C. 371 of International Application No. PCT/US2014/059386 filed Apr. 7, 2014, and claims priority to U.S. Provisional Application No. 61/888,155 filed Oct. 8, 2013, which is incorporated by reference in its entirety.

BACKGROUND OF THE INVENTION

Field of the Disclosure

The present disclosure relates to azeotrope-like compositions of HFO-E-1,3,4,4,4-Pentafluoro-3-trifluoromethyl-1-butene and E-1-Chloro-3,3,3-trifluoropropene.

Description of Related Art

Many industries have been working for the past few decades to find replacements for the ozone depleting chlorofluorocarbons (CFCs) and hydrochlorofluorocarbons (HCFCs). The CFCs and HCFCs have been employed in a wide range of applications, including their use as aerosol propellants, refrigerants, cleaning agents, expansion agents for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents. In the search for replacements for these versatile compounds, many industries have turned to the use of hydrofluorocarbons (HFCs).

The HFCs do not contribute to the destruction of stratospheric ozone, but are of concern due to their contribution to the "greenhouse effect", i.e., they contribute to global warming. As a result of their contribution to global warming, the HFCs have come under scrutiny, and their widespread use may also be limited in the future.

SUMMARY OF THE INVENTION

Thus, there is a need for compositions that do not contribute to the destruction of stratospheric ozone and also have low global warming potentials (GWPs). Certain hydrofluoroolefins, such as HFO-E-1,3,4,4,4-pentafluoro-3-trifluoromethyl-1 butene (($CF_3$)$_2$CFCH=CHF, trans-HFO-1438ez, E-HFO-1438ez, E-1438ez) are believed to meet both goals. This disclosure provides a composition consisting essentially of (a) HFO-E-1,3,4,4,4-Pentafluoro-3-trifluoromethyl-1-butene and (b) E-1-Chloro-3,3,3-trifluoropropene; wherein the E-1-Chloro-3,3,3-trifluoropropene is present in an effective amount to form an azeotrope-like mixture with HFO-E-1,3,4,4,4-Pentafluoro-3-trifluoromethyl-1-butene.

BRIEF SUMMARY OF THE DRAWINGS

FIG. 1 is a graphical representation of an azeotrope-like composition of HFO-E-1,3,4,4,4-Pentafluoro-3-trifluoromethyl-1-butene and E-1-Chloro-3,3,3-trifluoropropene at a temperature of about 27.8° C.

DETAILED DESCRIPTION OF THE INVENTION

In many applications, the use of a pure single component or an azeotropic or azeotrope-like mixture is desirable. For example, when a blowing agent composition (also known as foam expansion agents or foam expansion compositions) is not a pure single component or an azeotropic or azeotrope-like mixture, the composition may change during its application in the foam forming process. Such change in composition could detrimentally affect processing or cause poor performance in the application. Also, in refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure single component or an azeotropic or azeotrope-like composition, the refrigerant composition may change when leaked or discharged to the atmosphere from the refrigeration equipment. The change in refrigerant composition may cause the refrigerant to become flammable or to have poor refrigeration performance. Accordingly, there is a need for using azeotropic or azeotrope-like mixtures in these and other applications, for example azeotropic or azeotrope-like mixtures containing HFO-E-1,3,4,4,4-Pentafluoro-3-trifluoromethyl-1-butene and E-1-Chloro-3,3,3-trifluoropropene.

Before addressing details of embodiments described below, some terms are defined or clarified.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

This application includes compositions consisting essentially of (a) HFO-E-1,3,4,4,4-Pentafluoro-3-trifluoromethyl-1-butene and E-1-Chloro-3,3,3-trifluoropropene; wherein the E-1-Chloro-3,3,3-trifluoropropene is present in an effective amount to form an azeotrope-like mixture with HFO-E-1,3,4,4,4-Pentafluoro-3-trifluoromethyl-1-butene.

By effective amount is meant an amount of E-1-Chloro-3,3,3-trifluoropropene, which, when combined with HFO-E-1,3,4,4,4-Pentafluoro-3-trifluoromethyl-1-butene, results in the formation of an azeotrope-like mixture. This definition includes the amounts of each component, which amounts may vary depending on the pressure applied to the composition so long as the azeotrope-like compositions continue to exist at the different pressures, but with possible different boiling points.

Therefore, effective amount includes the amounts, such as may be expressed in weight or mole percentages, of each component of the compositions of the instant invention which form azeotrope-like compositions at temperatures or pressures other than as described herein. As recognized in the art, an azeotropic composition is an admixture of two or more different components which, when in liquid form under a given pressure, will boil at a substantially constant temperature, which temperature may be higher or lower than the boiling temperatures of the individual components, and which will provide a vapor composition essentially identical to the overall liquid composition undergoing boiling. (see, e.g., M. F. Doherty and M. F. Malone, Conceptual Design of Distillation Systems, McGraw-Hill (New York), 2001, 185-186, 351-359).

Accordingly, the essential features of an azeotropic composition are that at a given pressure, the boiling point of the liquid composition is fixed and that the composition of the vapor above the boiling composition is essentially that of the overall boiling liquid composition (i.e., no fractionation of the components of the liquid composition takes place). It is also recognized in the art that both the boiling point and the weight percentages of each component of the azeotropic composition may change when the azeotropic composition is subjected to boiling at different pressures. Thus, an azeotropic composition may be defined in terms of the unique relationship that exists among the components or in terms of the compositional ranges of the components or in terms of exact weight percentages of each component of the composition characterized by a fixed boiling point at a specified pressure.

For the purpose of this invention, an azeotrope-like composition means a composition that behaves like an azeotropic composition (i.e., has constant boiling characteristics or a tendency not to fractionate upon boiling or evaporation). Hence, during boiling or evaporation, the vapor and liquid compositions, if they change at all, change only to a minimal or negligible extent. This is to be contrasted with non-azeotrope-like compositions in which during boiling or evaporation, the vapor and liquid compositions change to a substantial degree.

Additionally, azeotrope-like compositions exhibit dew point pressure and bubble point pressure with virtually no pressure differential. That is to say that the difference in the dew point pressure and bubble point pressure at a given temperature will be a small value. In this invention, compositions with a difference in dew point pressure and bubble point pressure of less than or equal to 5 percent (based upon the bubble point pressure) is considered to be azeotrope-like.

It is recognized in this field that when the relative volatility of a system approaches 1.0, the system is defined as forming an azeotropic or azeotrope-like composition. Relative volatility is the ratio of the volatility of component 1 to the volatility of component 2. The ratio of the mole fraction of a component in vapor to that in liquid is the volatility of the component.

To determine the relative volatility of any two compounds, a method known as the PTx method can be used. The vapor-liquid equilibrium (VLE), and hence relative volatility, can be determined either isothermally or isobarically. The isothermal method requires measurement of the total pressure of mixtures of known composition at constant temperature. In this procedure, the total absolute pressure in a cell of known volume is measured at a constant temperature for various compositions of the two compounds. The isobaric method requires measurement of the temperature of mixtures of known composition at constant pressure. In this procedure, the temperature in a cell of known volume is measured at a constant pressure for various compositions of the two compounds. Use of the PTx Method is described in detail in "Phase Equilibrium in Process Design", Wiley-Interscience Publisher, 1970, written by Harold R. Null, on pages 124 to 126.

These measurements can be converted into equilibrium vapor and liquid compositions in the PTx cell by using an activity coefficient equation model, such as the Non-Random, Two-Liquid (NRTL) equation, to represent liquid phase nonidealities. Use of an activity coefficient equation, such as the NRTL equation is described in detail in "The Properties of Gases and Liquids," 4th edition, published by McGraw Hill, written by Reid, Prausnitz and Poling, on pages 241 to 387, and in "Phase Equilibria in Chemical Engineering," published by Butterworth Publishers, 1985, written by Stanley M. Walas, pages 165 to 244. Without wishing to be bound by any theory or explanation, it is believed that the NRTL equation, together with the PTx cell data, can sufficiently predict the relative volatilities of the HFO-E-1,3,4,4,4-Pentafluoro-3-trifluoromethyl-1-butene/E-1-Chloro-3,3,3-trifluoropropene compositions of the present invention and can therefore predict the behavior of these mixtures in multi-stage separation equipment such as distillation columns.

It was found through experiments that HFO-E-1,3,4,4,4-Pentafluoro-3-trifluoromethyl-1-butene and E-1-Chloro-3,3,3-trifluoropropene form azeotrope-like compositions.

To determine the relative volatility of this binary pair, the PTx method described above was used. The pressure in a PTx cell of known volume was measured at constant temperature for various binary compositions. These measurements were then reduced to equilibrium vapor and liquid compositions in the cell using the NRTL equation.

The pressures measured versus the compositions in the PTx cell for HFO-E-1,3,4,4,4-Pentafluoro-3-trifluoromethyl-1-butene and E-1-Chloro-3,3,3-trifluoropropene mixtures are shown in FIG. 1, which graphically illustrates the formation of azeotrope-like compositions consisting essentially of 1-44 mole % HFO-E-1,3,4,4,4-Pentafluoro-3-trifluoromethyl-1-butene and 56-99 mole % E-1-Chloro-3,3,3-trifluoropropene at 27.8° C. and pressures ranging from about 18 to 21 psia, and also illustrates the formation of azeotrope-like compositions consisting essentially of 84-99 mole % HFO-E-1,3,4,4,4-Pentafluoro-3-trifluoromethyl-1-butene and 1-16 mole % E-1-Chloro-3,3,3-trifluoropropene at 27.8° C. and pressures ranging from about 13 to 14 psia.

According to calculation, azeotrope-like compositions consisting essentially of 1-99 mole % HFO-E-1,3,4,4,4-Pentafluoro-3-trifluoromethyl-1-butene and 1-99 mole % E-1-Chloro-3,3,3-trifluoropropene are formed at temperatures ranging from about −40° C. to about 140° C. (i.e., over this temperature range, the difference in dew point pressure and bubble point pressure of the composition at a particular temperature is less than or equal to 5 percent (based upon the bubble point pressure)).

Some embodiments of azeotrope-like compositions are listed in Table 1

TABLE 1

Azeotrope-like compositions

| COMPONENTS | T (° C.) | Mole Percentage Range |
|---|---|---|
| HFO-E-1,3,4,4,4-Pentafluoro-3-trifluoromethyl-1-butene/E-1-Chloro-3,3,3-trifluoropropene | −40 | 1-28/72-99 94-99/1-6 |
| HFO-E-1,3,4,4,4-Pentafluoro-3-trifluoromethyl-1-butene/E-1-Chloro-3,3,3-trifluoropropene | −20 | 1-29/71-99 93-99/1-7 |
| HFO-E-1,3,4,4,4-Pentafluoro-3-trifluoromethyl-1-butene/E-1-Chloro-3,3,3-trifluoropropene | 0 | 1-32/68-99 91-99/1-9 |
| HFO-E-1,3,4,4,4-Pentafluoro-3-trifluoromethyl-1-butene/E-1-Chloro-3,3,3-trifluoropropene | 20 | 1-39/61-99 87-99/1-13 |
| HFO-E-1,3,4,4,4-Pentafluoro-3-trifluoromethyl-1-butene/E-1-Chloro-3,3,3-trifluoropropene | 40 | 1-53/47-99 77-99/1-23 |
| HFO-E-1,3,4,4,4-Pentafluoro-3-trifluoromethyl-1-butene/E-1-Chloro-3,3,3-trifluoropropene | 60 | 1-99/1-99 |
| HFO-E-1,3,4,4,4-Pentafluoro-3-trifluoromethyl-1-butene/E-1-Chloro-3,3,3-trifluoropropene | 80 | 1-99/1-99 |
| HFO-E-1,3,4,4,4-Pentafluoro-3-trifluoromethyl-1-butene/E-1-Chloro-3,3,3-trifluoropropene | 100 | 1-99/1-99 |
| HFO-E-1,3,4,4,4-Pentafluoro-3-trifluoromethyl-1-butene/E-1-Chloro-3,3,3-trifluoropropene | 120 | 1-99/1-99 |
| HFO-E-1,3,4,4,4-Pentafluoro-3-trifluoromethyl-1-butene/E-1-Chloro-3,3,3-trifluoropropene | 140 | 1-99/1-99 |

The azeotrope-like compositions of the present invention can be prepared by any convenient method including mixing or combining the desired amounts. In one embodiment of this invention, an azeotrope-like composition can be prepared by weighing the desired component amounts and thereafter combining them in an appropriate container.

The azeotrope-like compositions of the present invention can be used in a wide range of applications, including their use as aerosol propellants, refrigerants, solvents, cleaning agents, blowing agents (foam expansion agents) for thermoplastic and thermoset foams, heat transfer media, gaseous dielectrics, fire extinguishing and suppression agents, power cycle working fluids, polymerization media, particulate removal fluids, carrier fluids, buffing abrasive agents, and displacement drying agents.

One embodiment of this invention provides a process for preparing a thermoplastic or thermoset foam. The process comprises using an azeotrope-like composition as a blowing agent, wherein said azeotrope-like composition consists essentially of HFO-E-1,3,4,4,4-Pentafluoro-3-trifluoromethyl-1-butene and E-1-Chloro-3,3,3-trifluoropropene.

Another embodiment of this invention provides a process for producing refrigeration. The process comprises condensing an azeotrope-like composition and thereafter evaporating said azeotrope-like composition in the vicinity of the body to be cooled, wherein said azeotrope-like composition consists essentially of HFO-E-1,3,4,4,4-Pentafluoro-3-trifluoromethyl-1-butene and E-1-Chloro-3,3,3-trifluoropropene.

Another embodiment of this invention provides a process using an azeotrope-like composition as a solvent, wherein said azeotrope-like composition consists essentially of HFO-E-1,3,4,4,4-Pentafluoro-3-trifluoromethyl-1-butene and E-1-Chloro-3,3,3-trifluoropropene.

Another embodiment of this invention provides a process for producing an aerosol product. The process comprises using an azeotrope-like composition as a propellant, wherein said azeotrope-like composition consists essentially of HFO-E-1,3,4,4,4-Pentafluoro-3-trifluoromethyl-1-butene and E-1-Chloro-3,3,3-trifluoropropene.

Another embodiment of this invention provides a process using an azeotrope-like composition as a heat transfer media, wherein said azeotrope-like composition consists essentially of HFO-E-1,3,4,4,4-Pentafluoro-3-trifluoromethyl-1-butene and E-1-Chloro-3,3,3-trifluoropropene.

Another embodiment of this invention provides a process for extinguishing or suppressing a fire. The process comprises using an azeotrope-like composition as a fire extinguishing or suppression agent, wherein said azeotrope-like composition consists essentially of HFO-E-1,3,4,4,4-Pentafluoro-3-trifluoromethyl-1-butene and E-1-Chloro-3,3,3-trifluoropropene.

Another embodiment of this invention provides a process using an azeotrope-like composition as dielectrics, wherein said azeotrope-like composition consists essentially of HFO-E-1,3,4,4,4-Pentafluoro-3-trifluoromethyl-1-butene and E-1-Chloro-3,3,3-trifluoropropene.

The invention claimed is:

1. A composition consisting of:
   (a) (E)-1,3,4,4,4-Pentafluoro-3-trifluoromethyl-1-butene; and
   (b) (E)-1-Chloro-3,3,3-trifluoropropene; wherein the (E)-1-Chloro-3,3,3-trifluoropropene is present in an effective amount to form an azeotrope-like combination with the (E)-1,3,4,4,4-Pentafluoro-3-trifluoromethyl-1-butene.

2. The composition of claim 1, wherein the composition consists of 1-44 mole % (E)-1,3,4,4,4-Pentafluoro-3-trifluoromethyl-1-butene and 56-99 mole % (E)-1-Chloro-3,3,3-trifluoropropene.

3. The composition of claim 1, wherein the composition consists of 84-99 mole % (E)-1,3,4,4,4-Pentafluoro-3-trifluoromethyl-1-butene and 1-16 mole % (E)-1-Chloro-3,3,3-trifluoropropene.

4. The composition of claim 1, wherein the composition consists of 1-28 mole % (E)-1,3,4,4,4-Pentafluoro-3-trifluoromethyl-1-butene and 72-99 mole % (E)-1-Chloro-3,3,3-trifluoropropene.

5. The composition of claim 1, wherein the composition consists of 94-99 mole % (E)-1,3,4,4,4-Pentafluoro-3-trifluoromethyl-1-butene and 1-6 mole % (E)-1-Chloro-3,3,3-trifluoropropene.

6. The composition of claim 1, wherein the composition consists of 1-29 mole % (E)-1,3,4,4,4-Pentafluoro-3-trifluoromethyl-1-butene and 71-99 mole % (E)-1-Chloro-3,3,3-trifluoropropene.

7. The composition of claim 1, wherein the composition consists of 93-99 mole % (E)-1,3,4,4,4-Pentafluoro-3-trifluoromethyl-1-butene and 1-7 mole % (E)-1-Chloro-3,3,3-trifluoropropene.

8. The composition of claim 1, wherein the composition consists of 1-32 mole % (E)-1,3,4,4,4-Pentafluoro-3-trifluoromethyl-1-butene and 68-99 mole % (E)-1-Chloro-3,3,3-trifluoropropene.

9. The composition of claim 1, wherein the composition consists of 91-99 mole % (E)-1,3,4,4,4-Pentafluoro-3-trifluoromethyl-1-butene and 1-9 mole % (E)-1-Chloro-3,3,3-trifluoropropene.

10. The composition of claim 1, wherein the composition consists of 1-39 mole % (E)-1,3,4,4,4-Pentafluoro-3-trifluoromethyl-1-butene and 61-99 mole % (E)-1-Chloro-3,3,3-trifluoropropene.

11. The composition of claim 1, wherein the composition consists of 87-99 mole % (E)-1,3,4,4,4-Pentafluoro-3-trifluoromethyl-1-butene and 1-13 mole % (E)-1-Chloro-3,3,3-trifluoropropene.

12. The composition of claim 1, wherein the composition consists of 1-53 mole % (E)-1,3,4,4,4-Pentafluoro-3-trifluoromethyl-1-butene and 47-99 mole % (E)-1-Chloro-3,3,3-trifluoropropene.

13. The composition of claim 1, wherein the composition consists of 77-99 mole % (E)-1,3,4,4,4-Pentafluoro-3-trifluoromethyl-1-butene and 1-23 mole % (E)-1-Chloro-3,3,3-trifluoropropene.

* * * * *